United States Patent [19]
McCracken

[11] Patent Number: 5,816,554
[45] Date of Patent: Oct. 6, 1998

[54] EQUIPMENT SUPPORT BASE

[76] Inventor: Ronald G. McCracken, 8924 W. Lane, Magnolia, Tex. 77355

[21] Appl. No.: 746,925

[22] Filed: Nov. 18, 1996

[51] Int. Cl.$^6$ .................................................. A47B 91/00
[52] U.S. Cl. ...................... 248/346.01; 248/519; 52/298
[58] Field of Search ................. 248/346.01, 346.02, 248/346.03, 346.5, 676, 678, 519, 237; 52/298, 410, 408

[56] References Cited

U.S. PATENT DOCUMENTS

| | | | |
|---|---|---|---|
| 1,541,129 | 6/1925 | Farley . | |
| 2,106,956 | 2/1938 | Nakamura | 248/49 |
| 3,138,659 | 6/1964 | Cognet et al. | 174/95 |
| 3,576,304 | 4/1971 | Gillemot | 248/54 |
| 3,691,776 | 9/1972 | Hull | 52/298 |
| 4,502,653 | 3/1985 | Curtis, Jr. | 248/55 |
| 4,513,934 | 4/1985 | Pruyne | 248/49 |
| 4,515,195 | 5/1985 | Gladstein | 248/519 |
| 4,829,732 | 5/1989 | Dahowski et al. | 248/519 |
| 5,217,191 | 6/1993 | Smith | 248/55 |

*Primary Examiner*—Ramon O. Ramirez
*Assistant Examiner*—Willie Berry, Jr.
*Attorney, Agent, or Firm*—Conley, Rose & Tayon, P.C.

[57] ABSTRACT

A support base is disclosed through which pipe and related equipment typically found on the roofs of commercial buildings may be supported. The support base consists of a single molded plastic structure, flat on its bottom so as to rest in a stable fashion on the roof, and containing functional features on the top. The functional features include a central recess, supporting ridges radiating outward from the central recess, and recesses positioned on the supporting ridges.

20 Claims, 9 Drawing Sheets

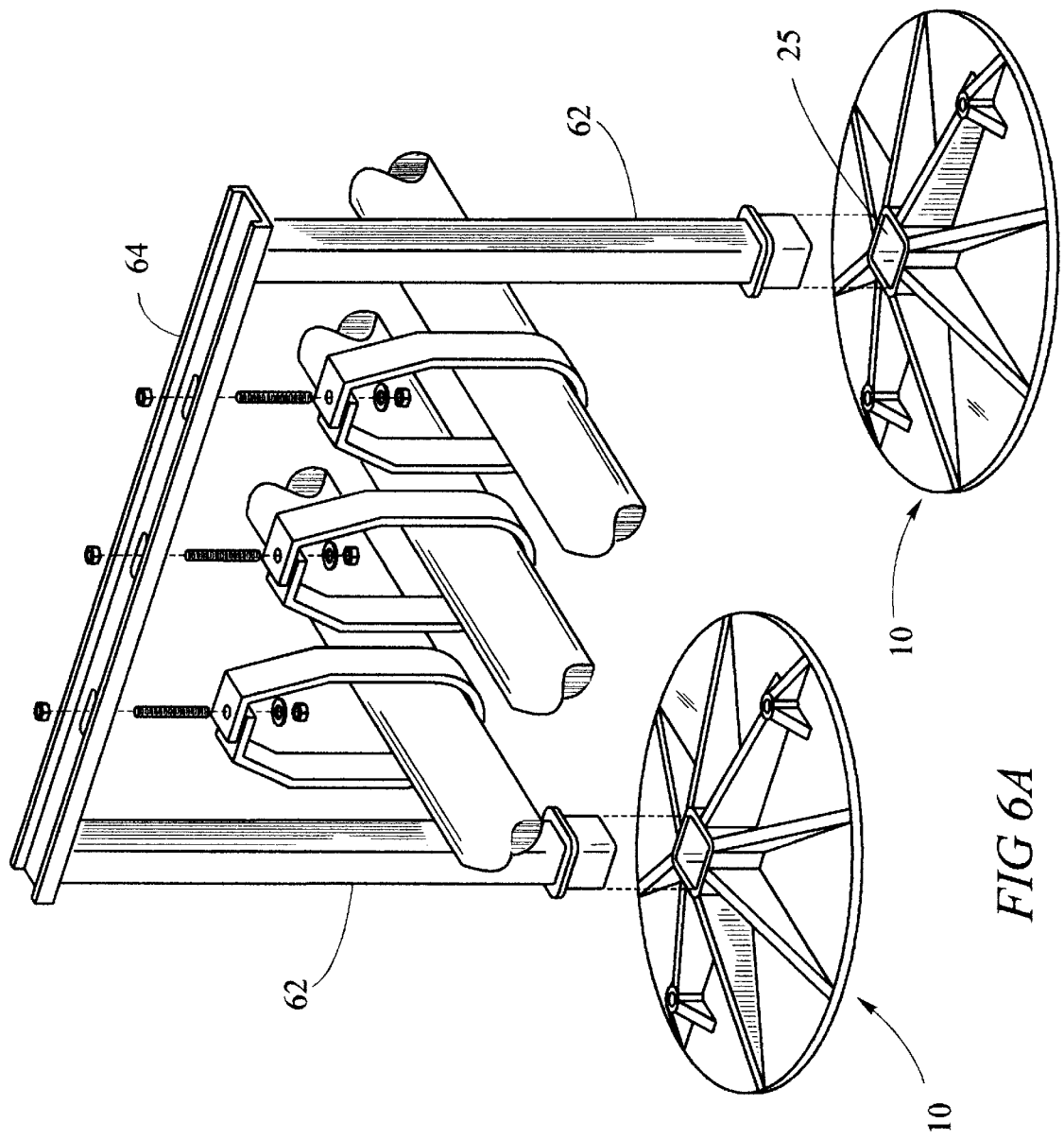

EQUIPMENT SUPPORT BASE

FIELD OF THE INVENTION

The present invention relates generally to systems for supporting telecommunications antennas, waveguides, ice bridges, equipment, walkways, electric wiring raceways, heating/cooling equipment, ductwork, piping, and similar equipment and materials, which extend along the rooftops of buildings, inside buildings, on top of water tanks or on raw land sites, at petrochemical plants, offshore drilling rig platforms, electrical transformer supports, or for oil, gas steam condensers, and water, acid and chemical lines. The support system consists of a molded plastic base which includes ribs for strength in supporting the load which the base supports. A series of such supports are placed on the rooftops, without affixing them to the rooftop, and the associated equipment is suspended by these supports. The support system allows the supported equipment to expand or move due to thermal expansion, wind forces, water loading, and other forces, without damage to the surface on which it rests.

BACKGROUND OF THE INVENTION

It is common in commercial buildings for there to be various types of equipment and pipes which run along the top of the roofs of such buildings; such equipment will generally be exposed to the elements. This equipment may typically include telecommunications antennas, waveguides, ice bridges, walkways, electric wiring raceways, heating/cooling equipment, ductwork, piping, and similar equipment and materials.

The equipment is typically subjected to various forces and stresses. These forces over time may damage the equipment itself or the building structure if no countermeasures are taken. Some of the forces that affect rooftop equipment include thermal expansion and cooling cycles, wind loading, and loading and stress forces associated with rain, snow, and ice. In particular, problems can arise when equipment supports are permanently attached to the roof, such as by the use of bolts or similar penetrating devices. Over time, the combination of relative motion due to various external forces and differences in coefficients of thermal expansion between the roof and the support device can result is breakdown of the roof itself.

It is currently common practice for pipes and/or equipment to be supported above the roof surface at intervals along their length by placing blocks of wood between the roof surface and the pipes or equipment. With temperature changes, the pipes or equipment expand and contract, which typically causes the block to move with the pipe or equipment. After a period of time, the movement of the block against the roof causes damage to the roofing material, or even to the uderlying structure, which often results in a leak and requires expensive roof repair. Even where the blocks are nailed to the roof, the nails and the wood usually deteriorate in a relatively short period of time so that the blocks break loose. Further, wood blocks are difficult to seal, so that the block system often leaks around the nail holes. Finally wood blocks are not easily adaptable to support the variety of equipment that is now found on commercial roofs and industrial structures. Thus whenever some equipment beyond a simple pipe must be supported, there are labor costs associated with the carpentry work necessary to fashion an acceptable supporting structure.

Other types of support include support bases made of concrete or the like, and include various devices that allow the pipes or other equipment to move somewhat while being supported by the base. Concrete bases have several disadvantages. For example, concrete does not perform well in shear loading and is heavy and brittle. Hence, it is desirable to provide a base that is lightweight but tough and performs well in various load conditions.

It is also desirable to provide a support that effectively distributes the load over the entire base footprint, so as to avoid unnecessarily localized stresses on the roof surface.

SUMMARY OF THE INVENTION

The present invention provides a broadly applicable device for supporting various rooftop equipment and/or pipes. Hereinafter, when reference is made to the support of either pipe or equipment, it will be understood that use of either term is not intended to limit the scope of the invention and that a variety of items can be supported on the base of the present invention. The present device relies on the use of preformed support bases, so that labor is saved in setting up the support system. The bases need not be attached to the rooftop, but rather can be placed on a lip sheet made of roofing material or the like, which is placed between the roof and each support base, in order to allow for expansion and movement of the rooftop equipment and roof surface.

A significant advantage of the current invention is the variety of equipment that can be supported by the base. The base is adapted so that ancillary support rods may be disposed in the base. A variety of hangers, boxes, and supports can then be attached to the support rods. It is therefore possible to support the common types of pipe found on industrial roofs as well as other equipment and structures for which custom supports have previously been necessary.

Another advantage of the present base is that it provides a more even distribution of the load over the surface on which it rests.

Another advantage of this invention is that it is not necessary to cut a hole in the roof or otherwise disturb the building structure in order to utilize this support system. Another advantage of this invention is that the present support base is provided with a slip sheet that allows is to move relative to the roof surface, thereby reducing damage to the roof.

A further advantage of the present invention is that the support bases, which are not permanently affixed to the roof, can be quickly rearranged in order to accommodate additions or modifications to the equipment supported.

BRIEF DESCRIPTION OF THE DRAWINGS

These and other principles of the present invention may be more clearly understood by reference to the figures wherein:

FIGS. 6A–B are exploded views of alternative embodiments of a second system for supporting equipment on the base of FIG. 1;

DETAILED DESCRIPTION

Figure 1:
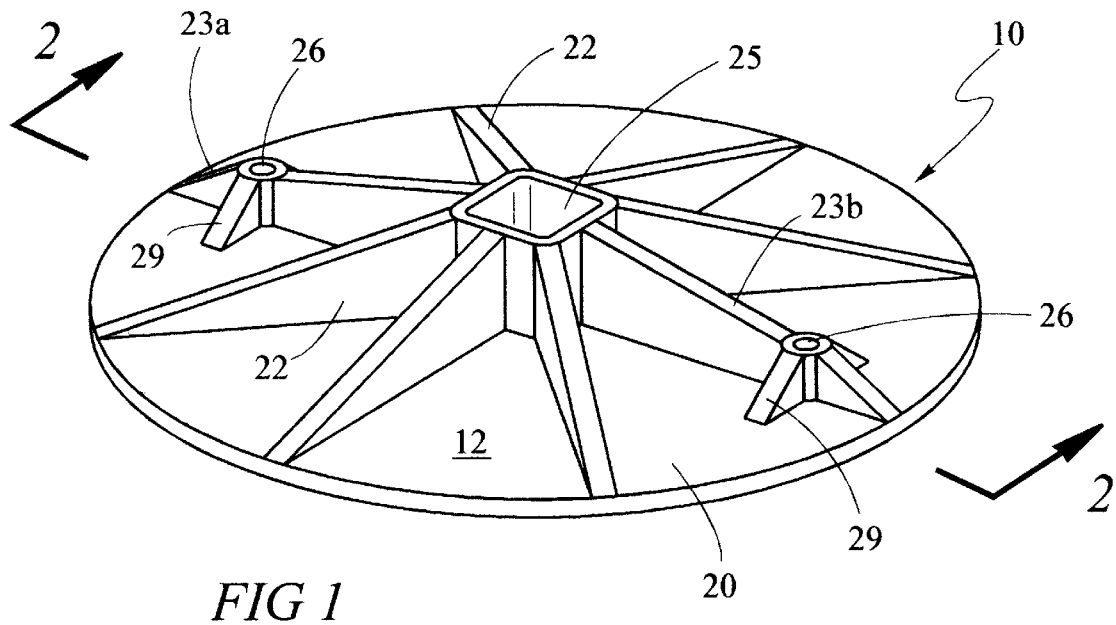
FIG. 1 is a schematic view of a support base constructed in accordance with the principles of the present invention.
Figure 2:
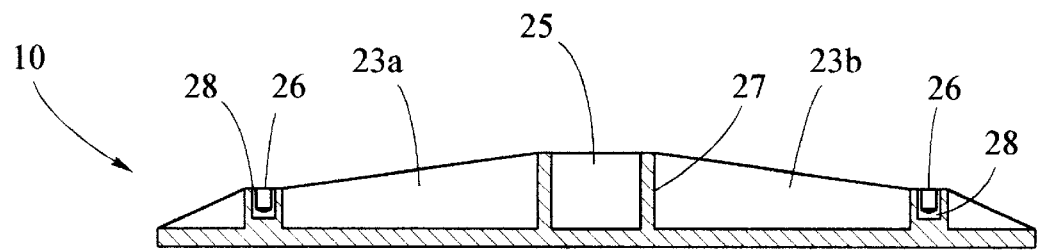
FIG. 2 is a cross-section of the base along lines 2—2 of FIG. 1.

Referring initially to FIGS. 1 and 2, the drawing shows a support device 10 that includes a substantially flat base 20. Support device 10 is preferably fashioned of a weather-resistant material such as plastic and preferably polyethylene. The plastic or other material selected should be sufficient to withstand the weathering effects necessary for the local climate and should be capable of withstanding shear loading; in addition the material should be of sufficient density to provide the weight necessary to hold the finished base securely to the surface. FIG. 1 depicts a base molded in a substantially circular shape, with a diameter of approximately 17 inches; however, other shapes and dimensions are possible. Circular bases may be molded with a diameter greater or lesser than 17 inches; likewise the base may be created in noncircular shapes such as square, oval, triangular, pentagonal, hexagonal, etc. The lower face of the base (not shown) is substantially flat; upper face 12 of the base is flat but also includes several raised functional features. The flat portion of the base is approximately ½ inch in thickness although other dimensions are possible. All portions of the base are integrally molded of the same structural material.

The upper face 12 of base 20 includes several distinctive functional features. Radiating from the center of the base 20 are a plurality of reinforcing ridges 22. The drawings show a base 20 with eight such reinforcing ridges 22; however, a base with more than or less than this number is possible. Said reinforcing ridges are substantially perpendicular to the upper surface 12 and extend substantially radially from the center of base 20. The reinforcing ridges 22 in the preferred embodiment are of sufficient thickness, approximately ⅜ inch, so as to provide the desired support and reinforcement. Other dimensions for the reinforcing ridges are contemplated, depending on the strength and rigidity required. The height of reinforcing ridges 22 as measured from the upper face 12 of base 20 varies along the radius of the base. As shown in FIG. 1, the height of ridges 22 is negligible at the perimeter of and increases linearly as the radius decreases.

Still referring to FIGS. 1 and 2, reinforcing ridges 22 terminate at a central cavity 25. Central cavity is defined by walls 27 and is preferably substantially square. The dimensions of central cavity 25 are preferably sized to receive a common size of commercially available square tubing material. In a preferred embodiment, central cavity 25 is approximately 2 ¾ inches deep as measured from the upper face of said base in the preferred embodiment, although this dimension may vary. Central cavity 25 is preferably smooth-walled. The walls 27 that form central cavity 25 are preferably V2 inch in thickness, although this dimension may vary. The bottom of central cavity 25 may contain additional plastic material such that the bottom of central cavity 25 is raised above the upper face of the base, or, if no additional material is added, the floor of central cavity 25 can be reinforced by the placement a washer or similar flat metal piece against it.

The height of reinforcing ridges 22 at the point where said ridges meet center cavity walls 27 is preferably equal to the height of said central cavity 25. In the preferred embodiment, reinforcing ridges 22 extend at equal angles from each other, however it is not necessary to the invention that the angles equal.

According to a preferred embodiment, each of an opposed pair of ridges 23a, 23b includes a reinforced recess 26 therein. Recesses 26 are generally cylindrical or barrel-like structures integrally molded with ridges 23a, 23b. Each recess 26 is preferably circular. While recesses 26 may be positioned at any point on the base, in the preferred embodiment, they are each located at a point approximately 5 inches from the center of base 20. Recesses 26 are preferably approximately 2 inches deep, although this dimension may vary without departing from the scope of the invention. The inner diameter of recesses 26 may vary, but should be of sufficient diameter to accept ancillary supporting rods. The outer diameter of each recess 26 may vary, although 1 ½ inches is a typical dimension.

According to a preferred embodiment a metal insert 28 is molded into each recess 26, as illustrated in FIG. 2. Inserts 28 are cylindrical pieces that each include a female threaded bore. When disposed in the recesses during molding of the base, the plastic material of the device 10 will form around said inserts 28 such that each insert 28 is permanently molded into a ridge 23. The recesses of this design are thus adapted to receive ancillary threaded support rods by threading such support rods into the bore of the insert. The bore of each insert 28 should be of a dimension so as to receive a commonly sized threaded rod.

In a preferred embodiment, recesses 26 are reinforced by molding a pair of buttresses 29 as part of the overall base structure. Buttresses 29, which are structurally similar to reinforcing ridges 22, preferably extend from recesses 26 perpendicular to the reinforcing ridges 23 that incorporate recesses 26, although they can also extend from the recesses in other directions. Buttresses 29 are typically the same height as the ridge 23 at the point at which the each recess 26 is located. Buttresses 29 can extend from the recess 26 as far as necessary, typically one inch. The number of buttresses 29 per recess 26 is typically two, however the number of buttresses per recess 26 may vary.

In alternative embodiments, one or more of said ridges 22 can be of greater thickness than remaining ridges. In one such embodiment, two such ridges are reinforced. The ridges that are reinforced are opposite each other at 180 degrees apart, so that they lie along a diameter of the circular base. These reinforced ridges are preferably the same ridges 23 that incorporate recesses 26, but can be perpendicular to ridges 23, or can comprise more than two of the ridges 22.

Figure 3:
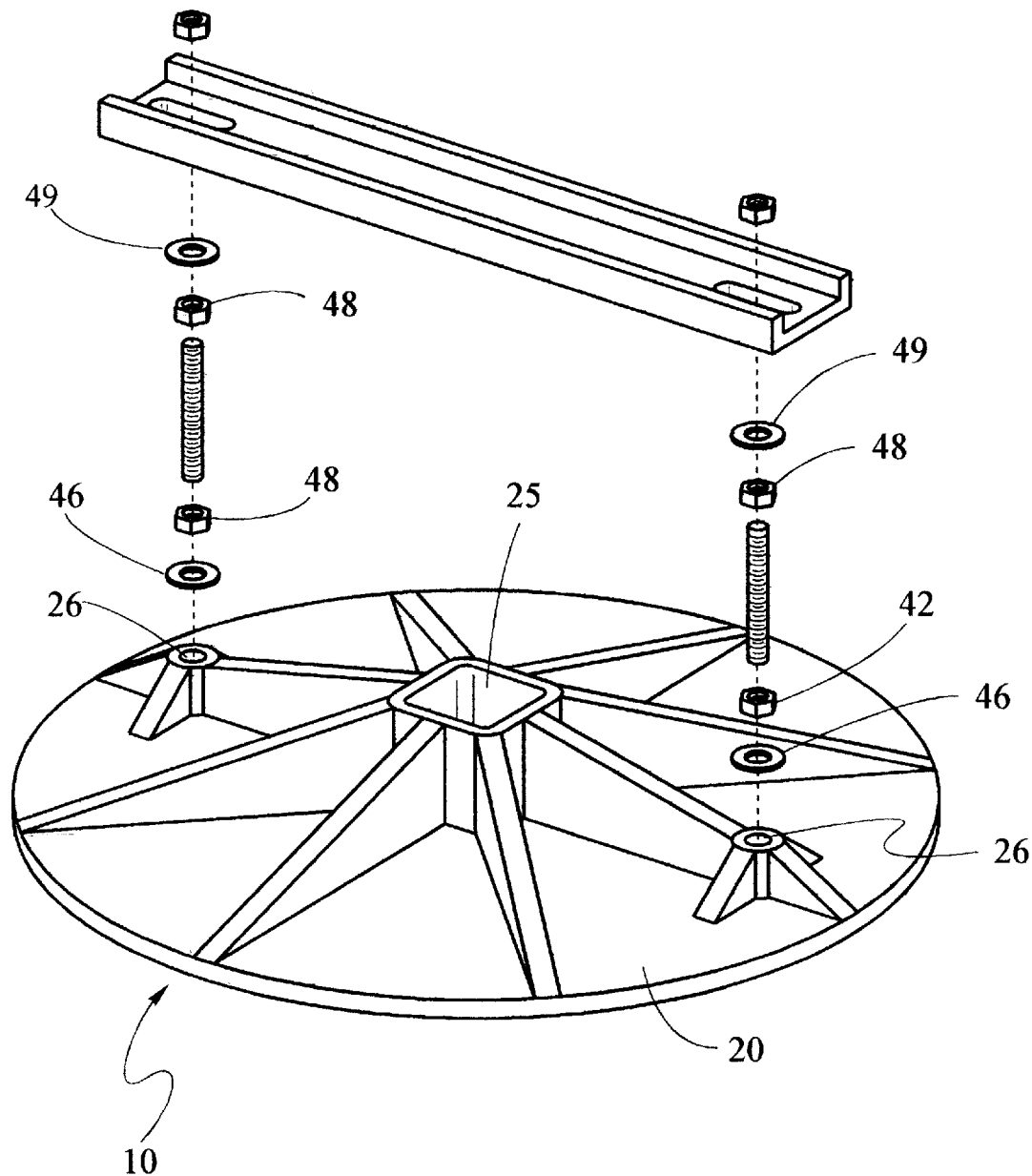
FIG. 3 is an exploded view of one embodiment of a system for supporting equipment on the base of FIG. 1.
Figure 4:
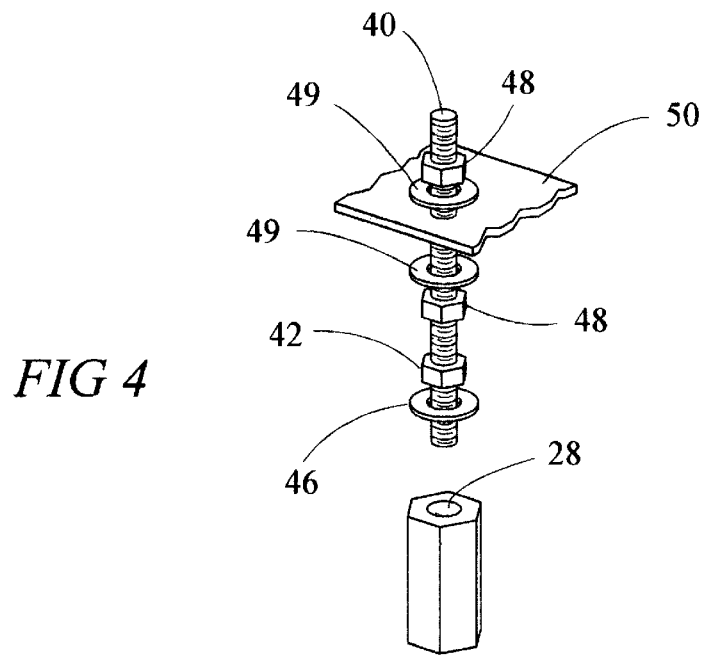
FIG. 4 is an enlarged schematic diagram of the system of FIG. 3.

Referring now to FIG. 3, an ancillary supporting means 40 can be used with base 10 in order to provide support for equipment, pipes or the like. Supporting means 40 are preferably lengths of all-thread that are threaded into recesses 26. Referring now to FIG. 4, a preferred technique for disposing a support rod 40 in a recess 26 is shown. An adjustable setting means, such as a nut 42, is first placed on the support rod 40. A washer 46 of sufficient diameter to bear on the flat upper surface of the recess 26 is then passed over the lower end of support rod 40. Rod 40 is then disposed in recess 26 such that the lower portion of the support rod is received in the recess 26 and engages the threads on the metallic insert 28. Rod 40 preferably does not rest the bottom of recess 26. Once rod 40 is positioned as desired in recess 26, it can be held firmly in place by tightening nut 42. If rod 40 does not touch the bottom of recess 26, the weight carried by rod 40 is born by base 10 at the upper surface of the recess 26, where the washer rests, and by engagement of the threads of rod 40 with the threads of insert 28. This is advantageous in that the load is by buttresses 29 and reinforcing ridges 22 to the entire base area 20. Another advantage of this method is that a secondary series of nuts 48 and washers 49 can then be disposed at the upper end of support rod 44 to support other hanging means 50 for use with the rooftop equipment.

In operation, a plurality of bases that are configured as shown in FIG. 3 can be positioned so as to advantageously support pipe or other rooftop equipment. In accordance with the present invention, the bases are not secured to the roof by adhesive, nailing means, or any other means. Once the required number of bases has been positioned, the ancillary supporting equipment is then attached to each base as described above. A variety of equipment may be supported in this manner including as T-bars, hangers, support boxes, and roller bearings and the like. One such possible system is shown in FIG. 5.

Figure 5:
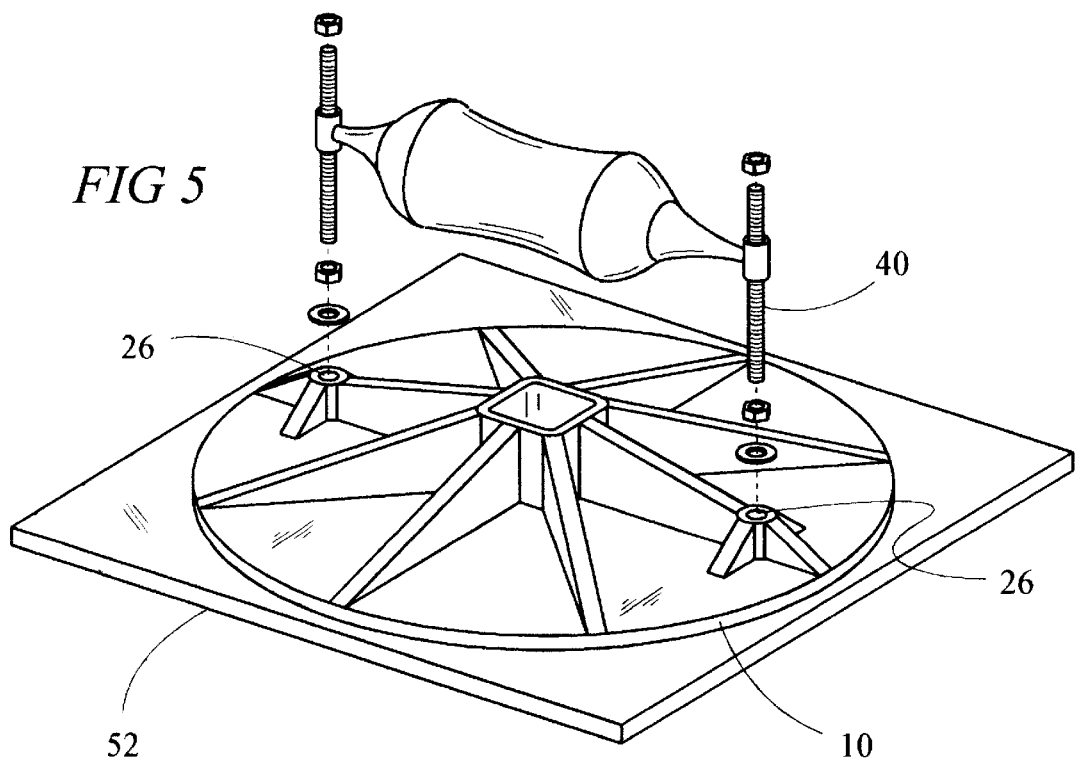
FIG. 5 is an exploded view of an alternative embodiment of the system of FIG. 3.

In rooftop applications, where damage to the underlying surface is particularly undesirable, a slip sheet is used in conjunction with the support base, as shown in FIG. 5. In this application, a slip sheet 52 is placed on the rooftop and the support base then rests on the slip sheet. Slip sheet 52 is preferably formed of roofing material or other suitable, durable material. It has been found that a slip sheet formed of a high friction material will tend to hold the support base in place so that the support base will resist movement and it is not necessary to adhere the slip sheet 52 to the roof. Use of a slip sheet is advantageous because it does not require puncturing the roof with nails, screws, or other fasteners. Likewise the base and slip sheet system may be quickly repositioned if necessary.

Figure 6B:
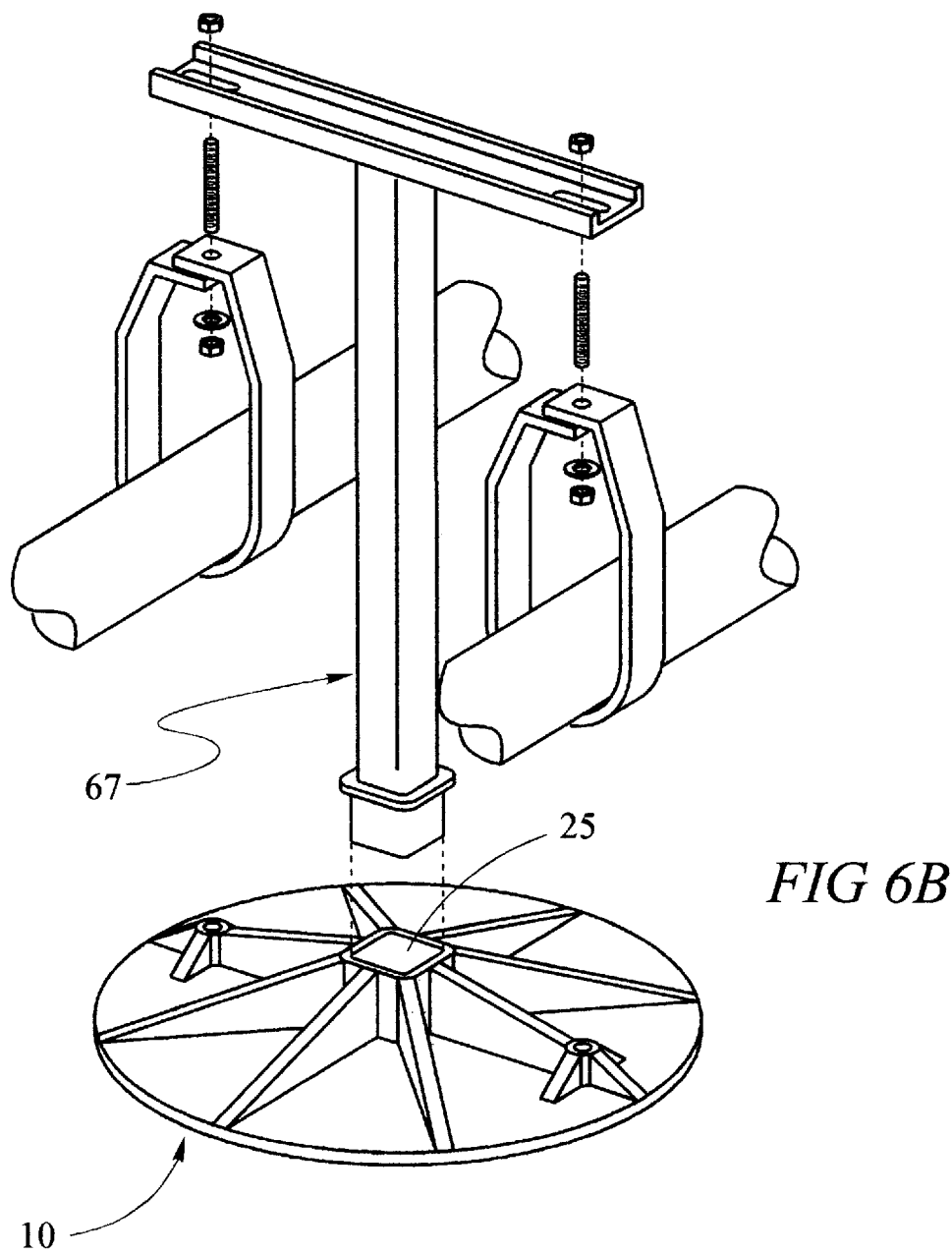

Referring now to FIGS. 6A and 6B, an alternative technique for utilizing the present base is shown. In the embodiment shown in FIG. 6A, a support 62 is provided in the central cavity 25 of each of a pair of bases 10, and a mounting structure such as the cross beam 64 is attached to supports 62. This technique allows larger equipment and heavier loads to be supported, as the load is divided between the two bases. Supports 62 preferably comprise lengths of square tubing, although they can be any suitable rigid material. Because of the greater loads applied to supports 62, bases 10 are particularly susceptible to puncturing under cavity 25. For this reason it is preferred to either reinforce the floor of cavity 25 as described above, or to prevent supports 62 from resting on the floor of the cavity. FIG. 6B shows a single base 10 supporting equipment on a T-bar 67 received in central cavity 25.

Figure 7:
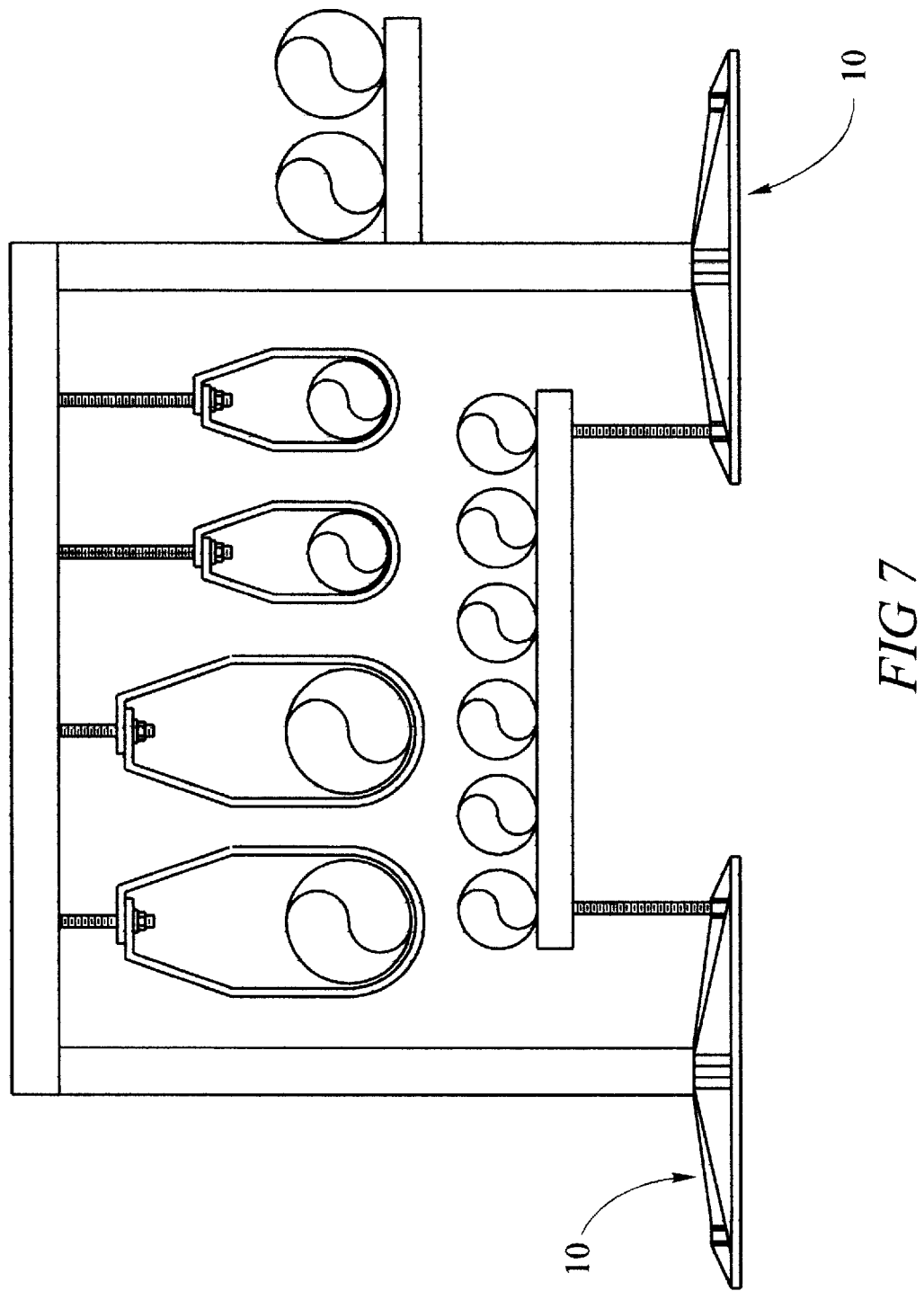
FIG. 7 is a schematic view of the present bases used in conjunction with the systems of FIGS. 3 and 6 to support a plurality of pipes.

The systems described above can be combined. For example, bases can be used in pairs, with supports received in both central cavities 25 and recesses 26, as shown in FIG. 7.

Figure 8:
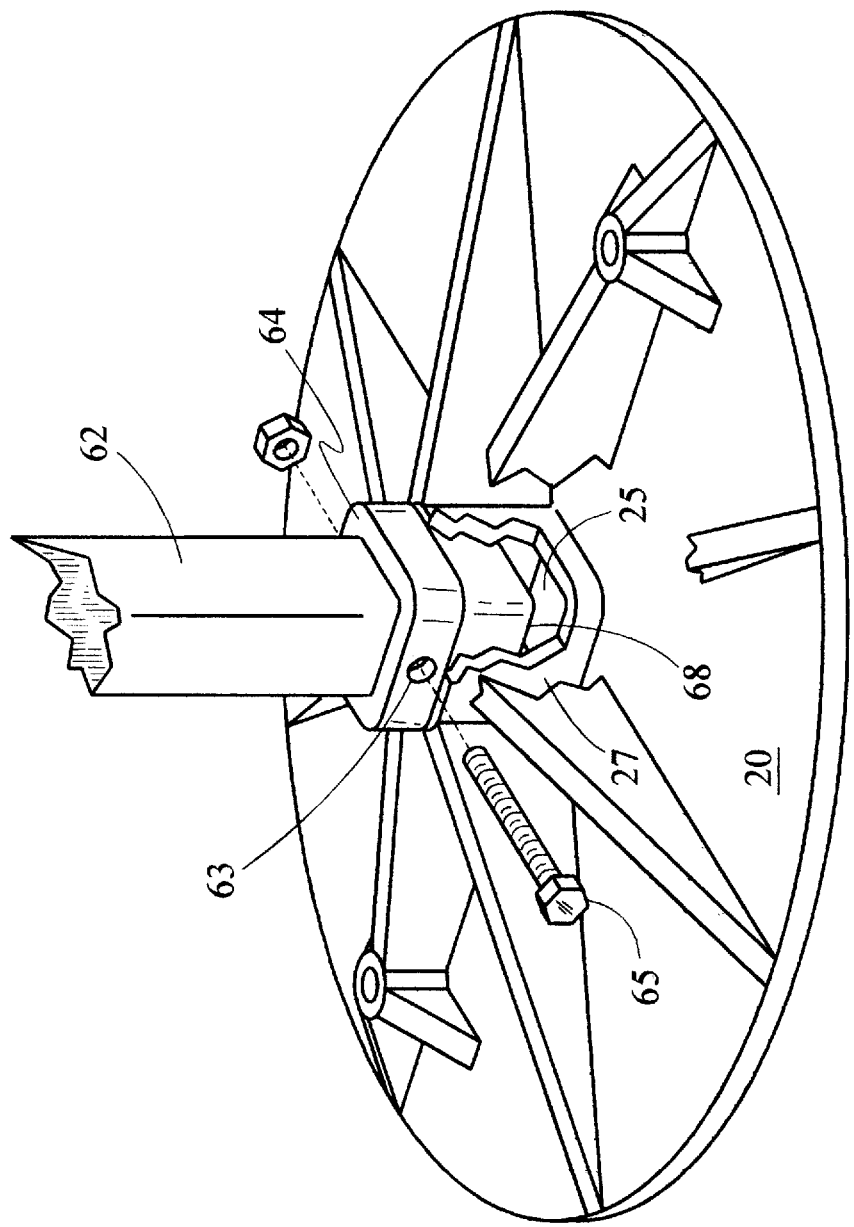
FIG. 8 is a partial cutaway view of a base used in the system of FIG. 6.

Referring now to FIG. 8, one system for preventing a support 62 from resting on the floor of central cavity 25 entails affixing a collar 64 to support 62 so that collar 64 rests on the upper surface of central cavity 25. A hole 63 is preferably formed in collar 64 and corresponds in size and position to a pair of holes (not shown) in support 62. A bolt, dowel or cotter pin, or any similar device 65, can then be passed through both collar 64 and support 62. When the holes is properly placed in support 62, the bottom 68 of support 62 stands above the floor of cavity 25. A similar result can also be obtained without use of the collar placing a bolt through the support and resting the bolt itself on the upper surface of the central recess when the support is placed in central recess 25. This latter method is less satisfactory than the method whereby a collar is utilized.

It should be noted that, depending on the application, advantage is made of the central void, the recesses, or both, in order to support the rooftop equipment. When a supporting rod is disposed in the central recess, the supporting rod may be placed so that it comes to rest at the bottom of the central recess. It will therefore be helpful if the end of the supporting rod which comes to rest on the bottom of the central recess is flat and level so that the supporting rod will make contact with the maximum possible area of the base.

Figure 9:
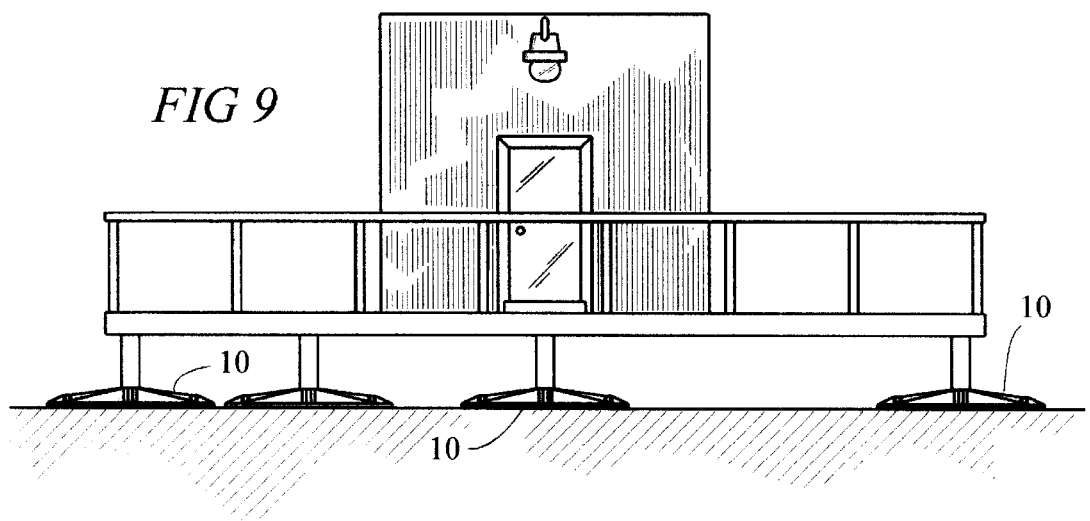
FIG. 9 is an elevation of the present bases used to support a rooftop grating walkway and a rooftop auxiliary building.
Figure 10:
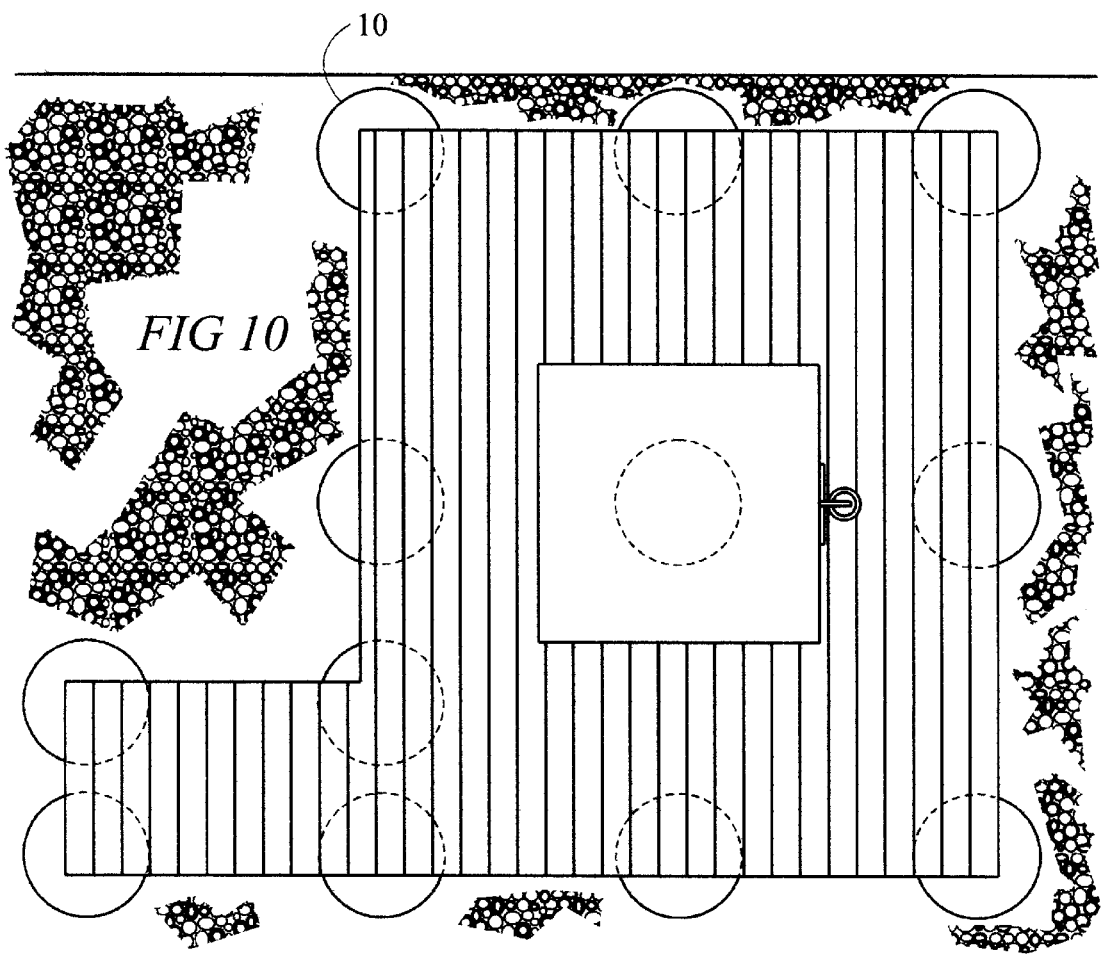
FIG. 10 is a plan view of the present bases in use as shown in FIG. 9.
Figure 11:
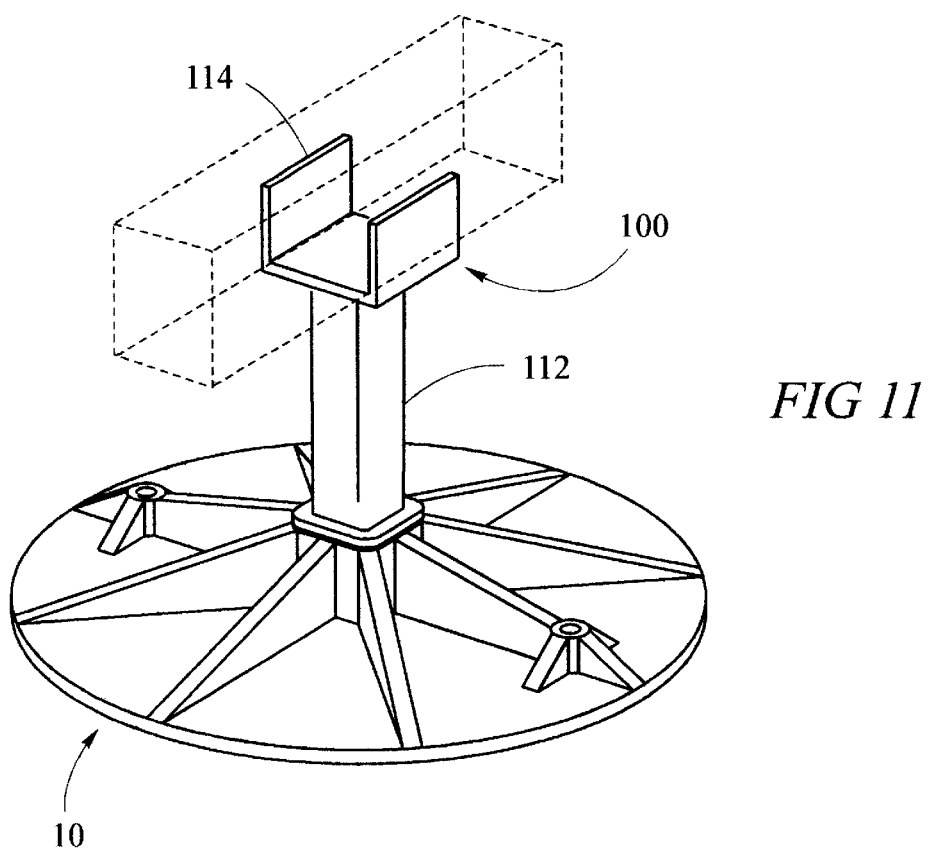
FIG. 11 is a perspective view of another alternative support that can be received in the present base.

The current invention is not limited to support systems for tubing and piping. FIGS. 9 and 10, for example, illustrate a use of the invention to support rooftop walkways and rooftop buildings. According to a preferred embodiment shown in FIG. 11, an equipment support 100 comprising a leg 112 and a platform 114 is used to support this type of load. Platform 114 comprises bent sheet metal, expanded metal or any other suitable load bearing device, and is preferably adapted to receive 4×4's, angle iron, I-beams, or similar structural material, in the manner shown in phantom in FIG. 11.

Figure 12:
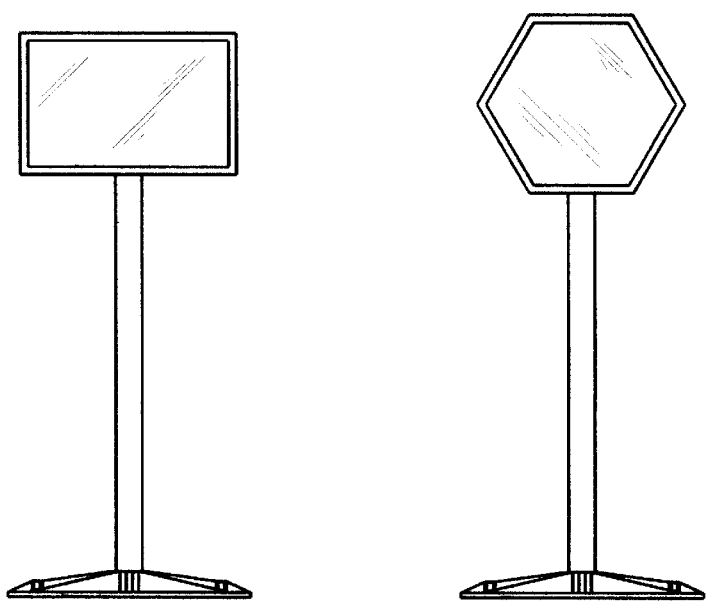
FIG. 12 shows the present base in use supporting portable signs.

The possible applications of the invention also include the use of the base to support movable signs. Examples of this application are shown in FIG. 12.

When necessary, the relatively soft plastic structure of the support base makes it possible to pass nails, screws, or other fasteners through the base. Thus, for example, it would be possible to affix the base to a sheet of plywood by drilling sheetrock screws through the base into the plywood.

While a preferred embodiment is disclosed, it will be understood that other embodiments exist. The preferred embodiment, for example, has focused on the support of piping equipment on rooftops. However, the invention is applicable to any situation in which it is necessary to support equipment on a surface by means of a system of movable supports. Therefore, the specific description of the invention above should not be construed as limiting the scope of the invention but merely as providing illustrations of some of the applications of the embodiment of the invention. The scope of the invention should be determined by the appended claims and their legal equivalents, rather than by the examples given.

I claim:

1. An equipment support base comprising
   a substantially planar member having upper and lower surfaces;
   a plurality of reinforcing ridges extending perpendicularly from said upper surface;
   a central cavity defined between said ridges; and
   at least two recesses, each recess being incorporated into one of said reinforcing ridges and having its opening in the upper surface of said ridge.

2. The equipment support base as described in claim 1 wherein the base is substantially circular.

3. The equipment support base as described in claim 1 wherein eight reinforcing ridges are integrally formed with the said base.

4. The equipment support described in claim 1 wherein the equipment support base is formed from molded plastic.

5. The equipment support base described in claim 1 wherein said reinforcing ridges have negligible height at the outer edge of the base and increase in height toward said central cavity, and where the height of said reinforcing ridges is equivalent to the height of the central recess at the point where the central recess meets the reinforcing ridges.

6. The equipment support base described in claim 1 wherein the central cavity is substantially square in shape and includes substantially smooth walls.

7. The equipment support base described in claim 1 wherein at least one reinforcing ridge is thicker than the remaining reinforcing ridges.

8. The equipment support base described in claim 7 wherein each recess is positioned in a thicker reinforcing ridge.

9. The equipment support base described in claim 1 wherein the interior portion of each recess includes threads.

10. The equipment support base described in claim 1 wherein the lower surface of said base is substantially flat.

11. The equipment support base described in claim 1 wherein said reinforcing ridges increase in height toward said central cavity.

12. An equipment support base comprising:
a substantially planar member having upper and lower surfaces;
a plurality of reinforcing ridges extending perpendicularly from said upper surface;
a central cavity defined between said ridges; and
at least two recesses, each recess being incorporated into one of said reinforcing ridges
wherein each recess is further supported by at least two buttresses consisting of the same molded material as the base.

13. A system for supporting equipment comprising:
a substantially flat base having first and second surfaces;
reinforcing ridges formed on said first surface of said base;
a wall defining a central cavity between said ridges on said first surface;
at least two threaded recesses formed in said reinforcing ridges;
a threaded rod threadedly engaging each recess; and
a washer and nut secured to said threaded rod, wherein said nut is tightened against said washer, which in turn bears against the top of the recess.

14. The system for supporting equipment as described in claim 13 wherein a female threaded insert is housed in each recess and the threaded rod is threaded into said threaded insert.

15. A system for supporting equipment comprising:
a substantially flat base having first and second surfaces;
reinforcing ridges formed on said first surface, said ridges radiating outwardly from a point on said first surface;
walls defining a central cavity between said ridges;
at least two recesses, each of said recesses being positioned in one of said reinforcing ridges and having its opening in the upper surface of said ridge; and
a support rod received in said central cavity.

16. A system for supporting equipment comprising:
a substantially flat base having first and second surfaces;
reinforcing ridges formed on said first surface, said ridges radiating outwardly from a point on said first surface;
walls defining a central cavity between said ridges;
at least two recesses positioned in said reinforcing ridges;
a support rod received in said central cavity; and
a collar sized to fit over said support rod and to rest on said walls defining said central recess when said support rod is received in said central cavity.

17. The system according to claim 16 wherein said collar and said support rod each include a pair of holes therethrough, said holes being aligned when said support rod is in a desired position, and further including a stop member inserted through said aligned holes.

18. The system according to claim 17 wherein said stop member comprises a bolt.

19. The support system described in claim 17 wherein said holes are positioned such that said support rod is held above the bottom of said central cavity.

20. An equipment support base comprising:
a substantially planar member having upper and lower surfaces;
a plurality of reinforcing ridges extending perpendicularly from said upper surface;
a central cavity defined between said ridges; and
at least two recesses, each recess being incorporated into one of said reinforcing ridges
wherein a hollow threaded insert is molded into the material so as to define each recess.

* * * * *

(12) REEXAMINATION CERTIFICATE (4405th)
United States Patent
McCracken

(10) Number: US 5,816,554 C1
(45) Certificate Issued: Jul. 31, 2001

(54) EQUIPMENT SUPPORT BASE

(75) Inventor: Ronald G. McCracken, 8924 West La., Magnolia, TX (US) 77355

(73) Assignee: Ronald G. McCracken, Magnolia, TX (US)

Reexamination Request:
No. 90/005,856, Nov. 13, 2000

Reexamination Certificate for:
Patent No.: 5,816,554
Issued: Oct. 6, 1998
Appl. No.: 08/746,925
Filed: Nov. 18, 1996

(51) Int. Cl.$^7$ ................................... A47B 91/00
(52) U.S. Cl. .................. 248/346.01; 52/298; 248/519
(58) Field of Search .............. 248/346.01, 346.02, 248/346.03, 346.05, 676, 678, 519, 237; 52/298, 410, 408

(56) References Cited

U.S. PATENT DOCUMENTS 3,691,776 * 9/1972 Hull ........................................ 52/298
4,829,732 * 5/1989 Dahowski et al. ................... 248/519
5,217,191 * 6/1993 Smith ..................................... 248/55

OTHER PUBLICATIONS

1994 PPH Catalog.*
AC TODAY Article, Nov. 1994.*
Roofer Magazine Article, Jun. 1995.*
1995 PPH Brochure, Dec. 1995.*
1996 PPH Brochure, early 1996.*

* cited by examiner

*Primary Examiner*—Ramon O. Ramirez

(57) ABSTRACT

A support base is disclosed through which pipe and related equipment typically found on the roofs of commercial buildings may be supported. The support base consists of a single molded plastic structure, flat on its bottom so as to rest in a stable fashion on the roof, and containing functional features on the top. The functional features include a central recess, supporting ridges radiating outward from the central recess, and recesses positioned on the supporting ridges.

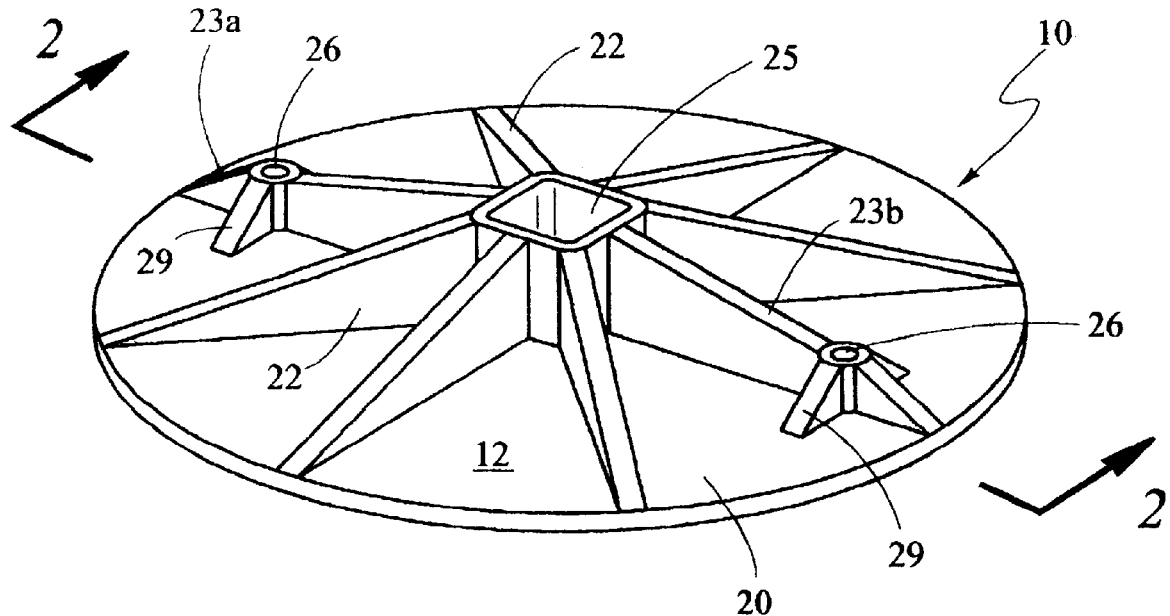

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–20 is confirmed.

* * * * *